United States Patent
Stahl et al.

(10) Patent No.: US 6,801,526 B1
(45) Date of Patent: Oct. 5, 2004

(54) SERVER FOR SUPPORTING THE ESTABLISHMENT OF TELEPHONE CALLS THROUGH AN IP NETWORK

(75) Inventors: Uwe Stahl, Leonberg (DE); Wolfgang Lautenschlager, Weissach-Flacht (DE); Lothar Krank, Ditzingen (DE); Hartmut Weik, Stuttgart (DE)

(73) Assignee: Alcatel, Paris (FR)

( * ) Notice: Subject to any disclaimer, the term of this patent is extended or adjusted under 35 U.S.C. 154(b) by 767 days.

(21) Appl. No.: 09/679,564

(22) Filed: Oct. 6, 2000

(30) Foreign Application Priority Data

Oct. 8, 1999 (DE) ......................................... 199 48 458

(51) Int. Cl.[7] .............................................. H04L 12/66
(52) U.S. Cl. ..................................... 370/352; 370/401
(58) Field of Search .................................. 370/352, 353, 370/354, 355, 356, 401, 466

(56) References Cited

U.S. PATENT DOCUMENTS

| | | | | |
|---|---|---|---|---|
| 6,021,126 A | * | 2/2000 | White et al. ................. | 370/352 |
| 6,128,304 A | * | 10/2000 | Gardell et al. .............. | 370/401 |
| 6,259,691 B1 | * | 7/2001 | Naudus ....................... | 370/352 |
| 6,266,405 B1 | * | 7/2001 | Madour et al. ........ | 379/220.01 |
| 6,298,062 B1 | * | 10/2001 | Gardell et al. .............. | 370/401 |
| 6,363,065 B1 | * | 3/2002 | Thornton et al. ........... | 370/352 |
| 6,404,746 B1 | * | 6/2002 | Cave et al. .................. | 370/262 |
| 6,661,785 B1 | * | 12/2003 | Zhang et al. ................ | 370/352 |
| 2001/0050911 A1 | * | 12/2001 | Eastman ...................... | 370/352 |
| 2002/0075846 A1 | * | 6/2002 | Valentine et al. ........... | 370/352 |
| 2002/0126653 A1 | * | 9/2002 | Vasarainen ................... | 370/352 |

OTHER PUBLICATIONS

ITU–T Recommendation H.323 Feb. 1998.

* cited by examiner

Primary Examiner—Chau Nguyen
Assistant Examiner—Christine Ng
(74) Attorney, Agent, or Firm—Sughrue Mion, PLLC

(57) ABSTRACT

The invention relates to a method of supporting the establishment of a telephone call from a calling terminal (TE1) through an IP network (IPNET) to a telephone terminal (TE4) of a telephone network (TELENET1), to a server (SERV) of an IP network, and to a computer product (CP) for carrying out the method. To route the call through the IP network (IPNET), the server (SERV) of the IP network (IPNET) is contacted, which controls the routing of the call through the IP network (IPNET). If the server (SERV) determines that the call is directed to a telephone terminal (TE3 to TE5) of a telephone network (TELENET1, TELENET2), it will contact a server (NPS) of this telephone network (TELENET1). The server (SERV) of the IP network will request from the server (NPS) of the telephone network number portability information about the telephone terminal (TE4) to which the call is directed. Based on the requested number portability information, the server (SERV) of the IP network will determine from a set of VOIP gateways (GW1, GW2) available between the IP network (IPNET) and the telephone network (TELENET1) that gateway (GW2) through which the call (VCON) is to be routed into the telephone network (TELENET1), and initiate the routing of the call through this VOIP gateway (GW2) into the telephone network (TELENET1).

11 Claims, 2 Drawing Sheets

SERVER FOR SUPPORTING THE ESTABLISHMENT OF TELEPHONE CALLS THROUGH AN IP NETWORK

BACKGROUND OF THE INVENTION

This invention relates to a method of supporting the establishment of a telephone call from a calling terminal through an IP network to a telephone terminal of a telephone network, to a server for supporting the establishment of telephone calls between calling terminals and called terminals through an IP network, and to a computer product for supporting the establishment of telephone calls between calling terminals and called terminals through an IP network.

The invention starts from the establishment of telephone calls through IP networks as is described, for example, in ITU-T Specification H.323, 2/1998, pages 1 to 2 and pages 12 to 34.

An H.323 gateway provides an interface between an IP network (IP=Internet Protocol) and a telephone network. The gateway encodes, compresses, and packetizes voice and/or video signals from the telephone network and then transports them as IP packets to a terminal of the IP network or to another H.323 gateway. In the reverse direction, the gateway decodes, decompresses, and disassembles the IP packets coming from a terminal of the IP network or from another H.323 gateway, so that the voice and/or video signals can be routed through the telephone network to a terminal of this network. This makes it possible to establish a telephone connection over which the voice and/or video signals are transported through an IP network.

To control the routing within the IP network, the VOIP gateways may contact a gatekeeper. The gatekeeper makes a central address translation function available to the VOIP gateways.

SUMMARY OF THE INVENTION

The object of the invention is to speed up the establishment of a telephone call that can be routed in part through an IP network.

This object is attained by a method of supporting the establishment of a telephone call from a calling terminal through an IP network to a telephone terminal of a telephone network, the method comprising the step of contacting a server of the IP network for routing the call through the IP network, wherein if the server of the IP network determines that the call is directed to a telephone terminal of a telephone network, it contacts a server of this telephone network, that the server of the IP network requests from the server of the telephone network number portability information about the telephone terminal to which the call is directed, and that based on the requested number portability information, the server of the IP network determines from a set of VOIP gateways available between the IP network and the telephone network that VOIP gateway through which the call is to be routed into the telephone network, and initiates the routing of the call through this VOIP gateway into the telephone network.

The object of the invention is further achieved by a server for implementing the above method, the server comprising an interface unit for communication with components of the IP network, and further comprising a control unit designed to control the routing of a specific call through the IP network when contacted for this purpose by one of the components of the IP network.

The object of the invention is still further achieved by a computer product for supporting the establishment of telephone calls between calling terminals and called terminals through an IP network according to the above method, the computer product being designed to provide, in conjunction with a computer, a control unit which controls the routing of a specific call through the IP network when contacted for this purpose by a component of the IP network.

The idea underlying the invention is to contact a server of a telephone network for routing a VOIP call (VOIP=Voice over IP) through an IP network if the VOIP call is to be routed to a telephone terminal of the telephone network through the IP network. The information, particularly number portability information, that is provided by the server of the telephone network about the routing of the VOIP call within the telephone network is then used to control the routing within the IP network.

One advantage of the invention is that the establishment and routing of VOIP calls is optimized and speeded up.

Furthermore, the invention permits a VOIP call to be established to the called terminal as directly as possible. The path used for establishing the call in the telephone network is minimized. Routing of the call to the called terminal through networks of two or more telephone network operators is avoided. All these advantages also result in advantages both for the caller in terms of the charge to be paid for a VOIP call and for the VOIP service provider in terms of revenue collected.

Advantageous developments of the invention are set forth in the subclaims.

It is particularly advantageous that for a VOIP call, both called telephone terminals of the telephone network and called IP terminals within the IP network are addressed by a telephone number, and that number portability is provided between number ranges assigned to the IP terminals of the IP network and number ranges assigned to telephone terminals of the telephone network.

BRIEF DESCRIPTION OF THE DRAWINGS

The invention will become more apparent by reference to the following description of several embodiments taken in conjunction with the accompanying drawings, in which.

DETAILED DESCRIPTION OF THE INVENTION

Figure 1:
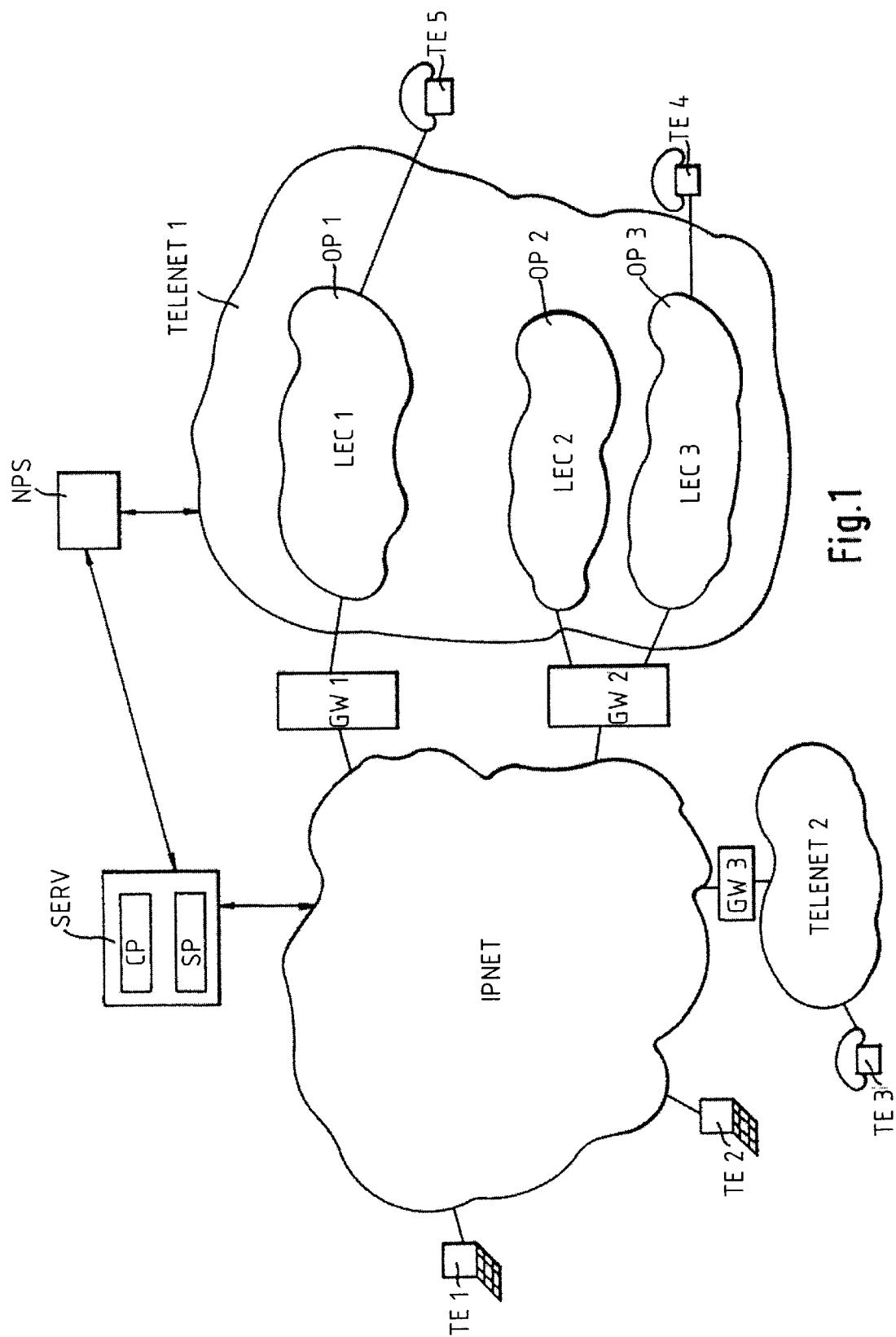
FIG. 1 is a block diagram of a VOIP communications system with a server in accordance with the invention.

FIG. 1 shows three communications networks IPNET, TELENET1, and TELENET2, three VOIP gateways GW1 to GW3, two servers SERV and NPS, and five terminals TE1 to TE5. Communications network IPNET is connected to communications network TELENET1 via VOIP gateways GW1 and GW2, and to communications network TELENET2 via VOIP gateway GW3. Terminals TE1 and TE2 are connected to communications network IPNET, terminal TE3 is connected to communications network TELENET2, and terminals TE4 and TE5 are connected to communications network TELENET1. Server SERV is associated with communications network IPNET and exchanges data with this network. Server NPS is associated with communications network TELENET1 and exchanges data with this network. Servers SERV and NPS communicate with each other.

Communications networks TELENET1 and TELENET2 are telephone networks, such as integrated services digital networks (ISDNs) or public switched telephone networks (PSTNs). Each of them may also be formed by two or more subnetworks, which may also be associated with different network operators. Such subnetworks may also be mobile radio networks, such as networks based on the GSM standard (GSM=Global System for Mobile Communications). Terminals may thus be connected to communications networks TELENET1 and TELENET2 via an analog PSTN line, an ISDN line, or an air interface according to the GSM or DECT standard (DECT=Digital European Cordless Telecommunications).

In communications network TELENET1, two or more access networks of different access network operators are available to subscribers of a local line network area in parallel. Of these access networks, three access networks LEC1, LEC2, and LEC3, which are associated with access network operators OP1, OP2, and OP3, respectively, and are available to the subscribers of one and the same local line network area, are shown in FIG. 1 by way of example.

Terminals TE3 to TE5 are telephone terminals, such as ISDN telephones or mobile telephones. Terminals TE4 and TE5 are associated with the same local line network area of communications network TELENET1, the two terminals being connected to communications network TELENET1 via access networks LEC3 and LEC1, respectively.

Communications network IPNET is an IP network (IP=Internet Protocol). It is formed by a data network that uses an IP protocol as Layer 3. Examples of such an IP protocol are the IPv4 or IPv6 protocols.

Terminals TE1 and TE2 are IP terminals, such as internet-capable telephones or computers that are equipped with an interface card for communication over communications network IPNET. They are provided with VOIP software (VOIP=Voice over IP), which enables a user to perform telephone communications over communications network IPNET.

The number of VOIP gateways GW1 to GW3 has been chosen by way of example. VOIP gateways GW1 to GW3 are gateways which allow a telephone call to be established through communications network IPNET. With the assistance of a gatekeeper, they perform address translation into an IP address, encoding/decoding, and packet assembly/disassembly of the data stream for transport through communications network IPNET, as well as further functions, such as echo cancellation. Furthermore, they control the establishment of calls through communications network IPNET. VOIP gateways GW1 to GW3 may be implemented according to ITU-T Recommendation H.323, for example.

Each of a set of VOIP gateways available between communications networks IPNET and TELENET1 is associated with one or more access networks or access network operators of communications network TELENET1. Each of these VOIP gateways provides a direct interface from communications network IPNET to the respective associated access network. Of this set of VOIP gateways, VOIP gateways GW1 and GW2 are shown in FIG. 1 by way of example. VOIP gateway GW1 provides an interface from communications network IPNET to access network LEC1, and VOIP gateway GW2 provides an interface from communications network IPNET to access networks LEC2 and LEC3.

Server NPS provides a number portability service within communications network TELENET1, and in this sense represents a server of communications network TELENET1. Furthermore, server NPS provides a service to server SERV of communications network IPNET.

"Number portability" means that in a local line network area in which two or more access networks of different network operators are available in parallel, the number assigned to a telephone terminal within communications network TELENET1 can be independent of the access network via which the subscriber is connected. Thus, when a subscriber of such a local line network area moves from a first access network operator to a second access network operator, he can take along the number assigned to him by the first access network operator and is then reachable at this number in the access network of the second access network operator. In that case, the number assigned to the area of the first access network operator has been "ported" to the area of the second access network operator.

Number portability is provided in communications network TELENET1 by arranging, for example, that on each call establishment, server NPS is triggered and checks which access network a telephone terminal addressed by the called number is associated with. Server NPS will then initiate a corresponding routing of the call, for example by entering a corresponding access network operator code in the call. In another embodiment, each access network operator is assigned a particular number range, and server NPS will translate the number assigned to a called telephone terminal to a second (internal) number when the subscriber of the called telephone terminal has moved to another access network operator.

Server NPS is formed by one or more interconnected processors on whose respective software platforms run application programs that control the functions of server NPS. Server NPS may for instance be a service control point (SCP) according to the IN architecture that is triggered by service switching points (SSPs) of communications network TELENET1 on each call establishment and then provides the above-described number portability service. It is also possible for server NPS to be triggered by signaling nodes of communications network TELENET1 and to act via these nodes on the call control within communications network TELENET1. In another embodiment, server NPS is formed by a functional unit of a switching node or signaling node of communications network TELENET1 and thus acts on the call control in this network. In that case, server NPS does not have a separate hardware and software platform and represents a virtual server.

Server SERV provides a service within communications network IPNET, and in this sense represents a server of communications network IPNET. It performs the following functions:

Server SERV is contacted by components of communications network IPNET for controlling the routing of a call through communications network IPNET. Server SERV then determines whether the call is directed to a telephone terminal of communications network TELENET1 or not. This can be determined from the address of the call: From the destination address of the VOIP call to be established it is determined, for example, whether the destination address is assigned to a particular address range that is reserved for IP terminals. As destination addresses, E.164 numbers are used, for example. If that is not the case, the call is directed to a telephone terminal of communications network TELENET1. If address porting is possible between terminals of communications networks TELENET1 and IPNET, server SERV advantageously has access to server NPS: By accessing server NPS, it determines whether or not the destination address has been ported from a terminal of communication network IPNET to a terminal of communications network TELENET1 or from a terminal of communications network TELENET1 to a terminal of communications network IPNET. From the presence of such porting and the address range, it is then determined whether the call is directed to a telephone terminal of communications network TELENET1.

When server SERV has determined that the call is directed to a telephone terminal of communications network TELENET1, it contacts a server of communications network TELENET1, namely server NPS. Server SERV of communications network IPNET requests from server NPS of communications network TELENET1 number portability information about the telephone terminal the call is directed to. Based on the requested number portability information, server SERV of communications network IPNET then determines that VOIP gateway from a set of VOIP gateways available between communications networks IPNET and TELENET1 through which the call is to be routed into communications network TELENET1, and initiates the routing of the call through this VOIP gateway into communications network TELENET1.

Server SERV is formed by one or more interconnected processors, on top of which a software platform consisting of, e.g., an operating system and a database system is implemented. The software platform and the processors together form a computer SP. Together with a computer product CP, computer SP performs the above-described functions of server SERV.

Computer product CP is formed by a data carrier and a computer program stored on this data carrier. If this computer program runs on computer SP, then server SERV executes the above-described functions. Server SERV is thus formed by computer CP and this computer program. Computer product CP may also be formed solely by this computer program as such.

The detailed structure of server SERV and the sequence of steps in the method according to the invention will be now be explained with reference to FIG. 2.

Figure 2:
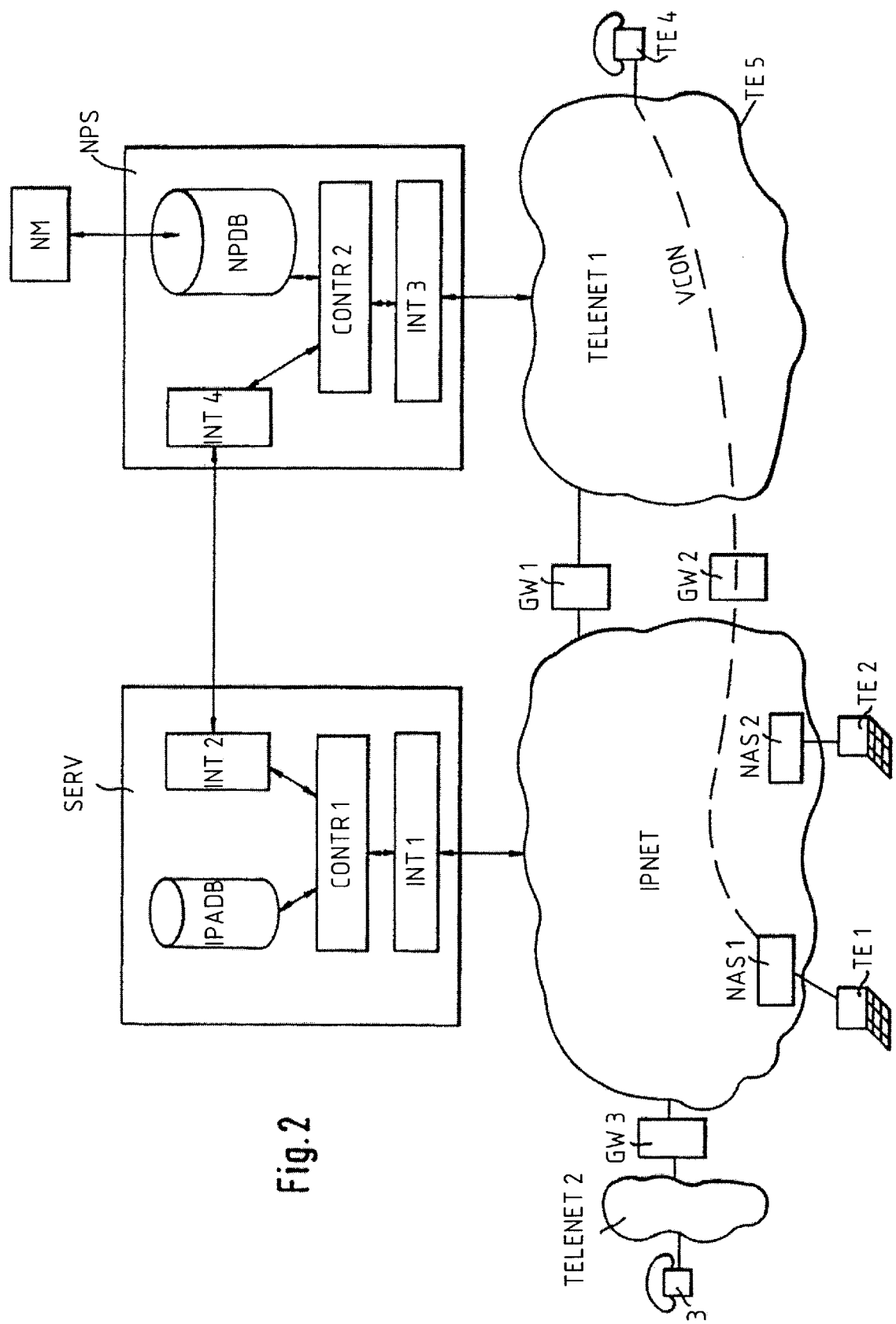
FIG. 2 is a functional diagram of a part of the VOIP communications system of FIG. 1.

FIG. 2 shows the communications networks IPNET, TELENET1, and TELENET2, the VOIP gateways GW1 to GW3, the servers SERV and NPS, a management unit NM, and the terminals TE1 to TE5.

From a functional point of view, server SERV contains a database IPADB, a control unit CONTR1, and two interface units INT1 and INT2.

Interface unit INT2 provides for communication between control unit CONTR1 and server NPS of communications network TELENET1. In particular, interface unit INT2 provides functions for processing the protocol stacks necessary for this communication.

Server SERV of communications network IPNET contacts server NPS of communications network TELENET1 using the INAP protocol. Communication between servers SERV and NPS preferably takes place via the signaling system of communications network TELENET1. Interface unit INT1 thus comprises functions for processing the protocol stack of Signaling System No. 7 and of the INAP protocol (INAP= Intelligent Network Application Part). It is also possible to transport the INAP protocol between servers SERV and NPS via an IP protocol stack. In place of the INAP protocol, the CAP or MAP protocol (CAP=Camel Application Part, MAP=Mobile Application Part), for example, may be used.

It is also possible that server SERV of communications network IPNET contacts server NPS of communications network TELENET1 using general mechanisms for communication between software applications. Thus, communication between servers NPS and SERV may, for instance, take place via a software bus, for example in accordance with the Common Object Request Broker Architecture (CORBA). This is particularly advantageous if server SERV of communications network IPNET and server NPS of communications network TELENET1 run on the same system platform or on two system platforms of similar design and communicate with one another via mechanisms of this system platform or these system platforms.

Interface unit INT1 provides for communication between control unit CONTR1 and components of communications network IPNET. Such components are network access servers via which the terminals are connected to communications network IPNET, specific VOIP servers of communications network IPNET, and/or VOIP gateways that connect communications network IPNET to telephone networks, such as communications networks TELENET1 and TELENET2. Of these components, VOIP gateways GW1 to GW3 and two network access servers NAS1 and NAS2, which allow terminals TE1 and TE2, respectively, access to communications network IPNET, are shown in FIG. 2 by way of example. Interface unit INT1, in particular, provides functions for processing the protocol stacks and communications mechanisms necessary for this communication.

It is also possible that server SERV additionally performs the function of a gatekeeper (for example according to ITU-T Recommendation H.323) within communications network IPNET. In that case, communication between the components of communications network IPNET and server SERV is advantageously performed using the communications mechanisms specified for communication with a gatekeeper.

Database IPADB serves to assign VOIP gateways to access networks of telephone networks. Thus, database IPADB contains information that links access network codes, access network operator codes, or number ranges with IP addresses of VOIP gateways. The VOIP gateways associated with an access network represent those VOIP gateways which provide a direct or particularly advantageous interface from communications network IPNET to the respective access network. One or more VOIP gateways may be associated with an access network. If two or more VOIP gateways are associated with an access network, it is advantageous to add to the respective association further parameters that serve as criteria for selecting one of those two or more VOIP gateways. Thus, in the database, the identification codes of access networks LEC1, LEC2, and LEC3, for example, are linked with VOIP gateways GW1, GW2, and GW2, respectively.

Control unit CONTR1 controls the routing of a specific telephone call through communications network IPNET when contacted for this purpose by one of the above-described components of communications network IPNET via interface unit INT1. To establish contact, the components of communications network IPNET send to server SERV a request message, for example, which conveys to server SERV the originating address and the destination address of a VOIP call to be established. In response to such a request message, the control unit is triggered for the VOIP call specified in the request message. A process is generated which determines through which of the VOIP gateways connected to communications network IPNET this VOIP call is to be routed, and which then initiates a corresponding routing through communications network IPNET.

If this process of control unit CONTR1 determines from the destination address or the type of destination address of the VOIP call to be established, and possibly from further data received from the component of communications network IPNET, that the specific call is directed to a telephone terminal of a telephone network, it will contact a server of this telephone network via interface unit INT2.

If porting of destination addresses is possible between terminals of communications networks TELENET1 and IPNET, the process advantageously has access to a number portability server in order to determine whether the specific call is directed to a telephone terminal of a telephone network or not. Such a number portability server may be a central server in which such portings are stored. It may also be formed by server NPS, by a central server of communications network IPNET, or by a database of server SERV, for example.

In implementing these functions, the process receives from the requesting component of communications network IPNET the number of the called terminal in the telephone network as the destination address of the specific call. From this number, the process determines which telephone network the called telephone terminal is associated with. It then determines by means of an allocation table which server is associated with this telephone network and how this server is to be contacted. Then, the process sends the number in a request message via interface unit INT2 to the determined server of this telephone network. With the request message, the process requests the addressed server to send number portability information about the telephone terminal specified by its number in the request message to server SERV. In response to the request message, the addressed server of the telephone network transmits as the number portability information an identification code of that access network or that access network operator with which the telephone terminal specified in the request message is associated.

If porting of destination addresses between terminals of communications networks TELENET1 and IPNET is possible, the number portability function may also comprise information about such porting. Thus, access to only a single server is necessary to determine, on the one hand, whether the specific telephone call is directed to a telephone terminal of a telephone network and, on the other hand, through which VOIP gateway the call is to be routed into the telephone network.

It is also possible that the addressed server of the telephone network transmits as the number portability information a ported number assigned to the transmitted number if the telephone terminal to which the transmitted number is assigned has been ported from a first to a second access network operator. If this telephone terminal has not been ported, a corresponding message, such as a specific identification, will be transmitted as the number portability information.

Based on the number portability information from the server of the telephone network and by accessing database IPADB, the process of control unit CONTR1 then determines from a set of VOIP gateways available between communications network IPNET and the telephone network that VOIP gateway through which the specific call is to be routed into the telephone network. The set of VOIP gateways available between communications network IPNET and the telephone network is formed by the VOIP gateways that are linked in database IPADB with access networks of this telephone network. These are preferably all VOIP gateways that provide an interface from communications network IPNET to access networks of this telephone network. Using the number portability information received from the server of the telephone network as a search key, the process then accesses database IPADB. By this access to database IPADB, the VOIP gateway or VOIP gateways linked with the access network code, the access network operator code or the telephone number/ported number are determined. If two or more VOIP gateways are determined, the process will select one of these VOIP gateways according to predetermined criteria (e.g., uniform usage, charge minimization). The VOIP gateway so determined is the gateway through which the call is to be routed into the telephone network.

The process of control unit CONTR1 then initiates the routing of the specific call through this VOIP gateway into the telephone network by sending to the requesting component a message in which it communicates to this component the IP address of the VOIP gateway determined.

Advantageously, server SERV also conveys the number portability information received from the server of the telephone network to the requesting component for entry into the destination address of the call, or to the VOIP gateway determined. This number portability information enables the VOIP gateway to correctly address the call in the telephone network. This has the advantage of eliminating the need to trigger a number portability service for the specific call in the telephone network, so that one database access is saved.

Server NPS contains two interface units INT3 and INT4, a control unit CONTR2, and a database NPDB.

Interface unit INT4 is designed analogously to interface unit INT2.

Interface unit INT3 provides for the communication with components of communications network TELENET1 that is specified in the description of FIG. 1.

Database NPDB contains information that links telephone numbers of communications network TELENET1 with number portability information. By means of management unit NM, this information can be changed for number administration within communications network TELENET1.

Control unit CONTR2, by accessing database NPDP, provides a number portability service within communications network TELENET1. Furthermore, in response to a request from server SERV, it transmits number portability information to server SERV. It is also possible that control unit CONTR2 does not distinguish whether the provision of a number portability service for communications network TELENET1 or the response to a request from server SERV is involved. This requires, however, that server SERV prepares its request message and interprets the response message accordingly. This has the advantage that control unit CONTR2 can be of a simpler design and that existing systems need not be modified.

Terminal TE1 initiates the establishment of a VOIP call VCON by sending a corresponding request message to its network access server NAS1. To route the call VCON through communications network IPNET, network access server NAS1 then contacts server SERV, which then controls the routing of the call VCON through communications network IPNET.

If the VOIP call had been initiated by terminal TE3, VOIP gateway GW3 would have contacted server SERV to route the call through communications network IPNET.

Server SERV then determines that the call VCON is directed to a telephone terminal of communications network TELENET1, namely to terminal TE4. It therefore contacts server NPS to request number portability information about terminal TE4, to which the call VCON is directed. Based on the requested number portability information, server SERV determines from a set of VOIP gateways available between communications network IPNET and communications network TELENET1 that VOIP gateway GW2 through which the call VCON is to be routed into communications network TELENET1. Server SERV then initiates the routing of the call VCON through this VOIP gateway GW2 into communications network TELENET1. VOIP gateway GW2 then initiates the completion of the call VCON to terminal TE4.

What is claimed is:

1. A method of supporting the establishment of a telephone call (VCON) from a calling terminal (TE1) through an IP network (IPNET) to a telephone terminal (TE4) of a telephone network (TELENET1), said method comprising the step of contacting a server (SERV) of the IP network (IPNET) for routing the call (VCON) through the IP network (IPNET), characterized in that if the server (SERV) of the IP network determines that the call (VCON) is directed to a telephone terminal (TE3 to TE5) of a telephone network (TELENET1, TELENET2), it contacts a server (NPS) of this telephone network (TELENET1), that the server (SERV) of the IP network requests from the server (NPS) of the telephone network number portability information about the telephone terminal (TE4) to which the call (VCON) is directed, and that based on the requested number portability information, the server (SERV) of the IP network determines from a set of VOIP gateways (GW1, GW2) available between the IP network (IPNET) and the telephone network (TELENET1) that VOIP gateway (GW2) through which the call (VCON) is to be routed into the telephone network (TELENET1), and initiates the routing of the call (VCON) through this VOIP gateway (GW2) into the telephone network (TELENET1).

2. A method as claimed in claim 1, characterized in that the called terminal (TE4) is addressed by the number assigned to it in the telephone network (TELENET1), and that the server (SERV) of the IP network communicates this number to the server (NPS) of the telephone network for determining the number portability information.

3. A method as claimed in claim 2, characterized in that as the number portability information, the server (NPS) of the telephone network communicates a ported number assigned to the communicated number if the telephone terminal has been ported from a first to a second access network operator (OP1 to OP3).

4. A method as claimed in claim 1, characterized in that as the number portability information, the server (NPS) of the telephone network communicates an identification code of that access network (LEC1 to LEC3) or access network operator (OP1 to OP3) with which the called telephone terminal (TE4) is associated.

5. A method as claimed in claim 1, characterized in that the server (SERV) of the IP network determines from the address of the call (VCON) whether the call (VCON) is directed to a telephone terminal (TE3 to TE5) of a telephone network (TELENET1, TELENET2) or not.

6. A method as claimed in claim 1, characterized in that the server (SERV) of the IP network, by accessing the server (NPS) of the telephone network, determines whether the call (VCON) is directed to a telephone terminal (TE3 to TE4) of a telephone network (TELENET1, TELENET2) or not.

7. A method as claimed in claim 1, characterized in that the server (SERV) of the IP network contacts the server (NPS) of the telephone network using an INAP protocol.

8. A method as claimed in claim 1, characterized in that the server (SERV) of the IP network and the server (NPS) of the telephone network are implemented on the same system platform and communicate with each other via this system platform.

9. A server (SERV) for supporting the establishment of telephone calls (VCON) between calling terminals (TE1 to TE3) and called terminals (TE4, TE5) through an IP network (IPNET), the server (SERV) comprising an interface unit (INT1) for communication with components (NAS1, NAS2, GW3) of the IP network (IPNET), and further comprising a control unit (CONTR1) designed to control the routing of a specific call (VCON) through the IP network (IPNET) when contacted for this purpose by one of the components (NAS1, NAS2, GW3) of the IP network, characterized in that the control unit (CONTR1) is further in such a way that when it determines that the specific call (VCON) is directed to a telephone terminal (TE4) of a telephone network (TELENET1), it contacts a server (NPS) of this telephone network (TELENET1) and requests from the server (NPS) of the telephone network number portability information about the telephone terminal (TE4) to which the specific call (VCON) is directed, and that the control unit (CONTR1) is further designed to determine, on the basis of the requested number portability information, that VOIP gateway (GW2) of a set of VOIP gateways (GW1, GW2) available between the IP network (IPNET) and the telephone network (TELENET1) through which the specific call is to be routed into the telephone network (TELENET1), and to initiate the routing of the specific call (VCON) through this VOIP gateway (GW2) into the telephone network (TELENET1).

10. A server (SERV) as claimed in claim 9, characterized in that it acts as a gatekeeper in the IP network (IPNET).

11. A computer product (CP) for supporting the establishment of telephone calls (VCON) between calling terminals (TE1 to TE3) and called terminals (TE4, TE5) through an IP network (IPNET), the computer product (CP) being designed to provide, in conjunction with a computer (SP), a control unit (CONTR1) which controls the routing of a specific call (VCON) through the IP network (IPNET) when contacted for this purpose by a component (NAS, NAS2, GW3) of the IP network, characterized in that the computer product (CP) is further designed in such a way that the control unit (CONTR1) which it implements in conjunction with a computer (SP) is so designed that when it determines that the specific call (VCON) is directed to a telephone terminal (TE4) of a telephone network (TELENET1), it contacts a server (NPS) of this telephone network (TELENET1), requests from this server (NPS) number portability information about the telephone terminal (TE4) to which the specific call (VCON) is directed, and, based on the requested number portability information, determines that VOIP gateway (GW2) of a set of VOIP gateways (GW1, GW2) available between the IP network (IPNET) and the telephone network (TELENET1) through which the specific call (VCON) is to be routed into the telephone network (TELENET1), and initiates the routing of the specific call (VCON) through this VOIP gateway (GW2) into the telephone network (TELENET1).

* * * * *